United States Patent Office 3,328,668
Patented June 27, 1967

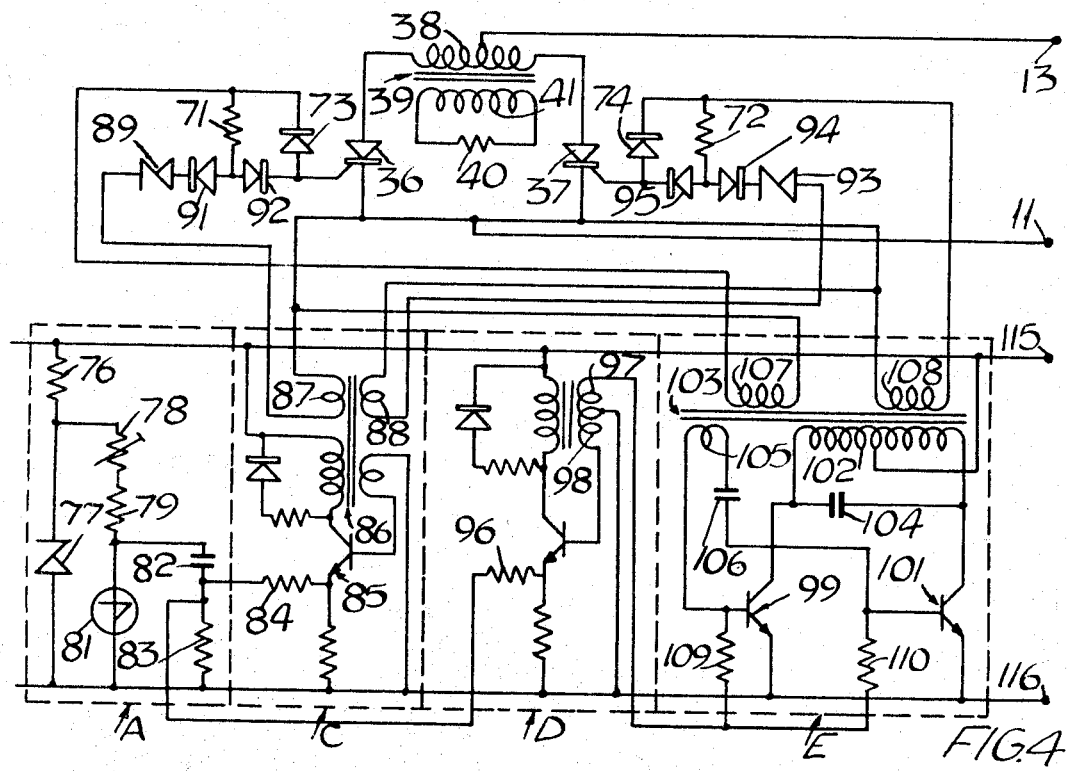
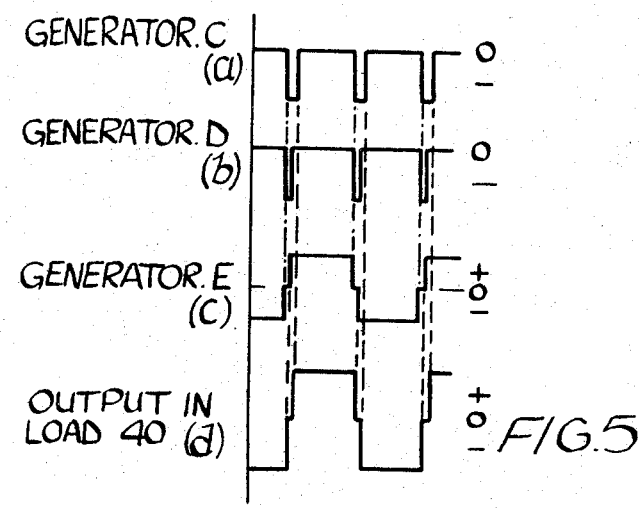

3,328,668
ELECTRIC CURRENT INVERTERS
Roger William Nolan, Redditch, and Derek Stanley Adams, Birmingham, England, assignors to Joseph Lucas (Industries) Limited, Birmingham, England
Filed Mar. 16, 1964, Ser. No. 352,144
Claims priority, application Great Britain, Mar. 21, 1963, 11,212/63
9 Claims. (Cl. 321—45)

The object of this invention is to provide an inverter in a convenient form.

The present invention makes use of a semi-conductor device which is a number of earlier applications we have termed a switchable rectifier, but which is now generally known as a gate controlled switch. Such a device has properties similar to a controlled rectifier, but has the additional property that it can be turned off by the application of negative pulses between its gate and cathode.

An inverter according to the invention comprises in combination first and second terminals for connection to a D.C. source, a transformer including a secondary winding in which the required A.C. output is generated, and a primary winding having a point intermediate its ends connected to the first terminal, a pair of gate controlled switches through which the ends of the primary winding respectively are connected to the second terminal, and a switching circuit associated with the gates of said switches for turning them on and off to produce an alternating current flow in the secondary winding of the transformer.

Figure 1:
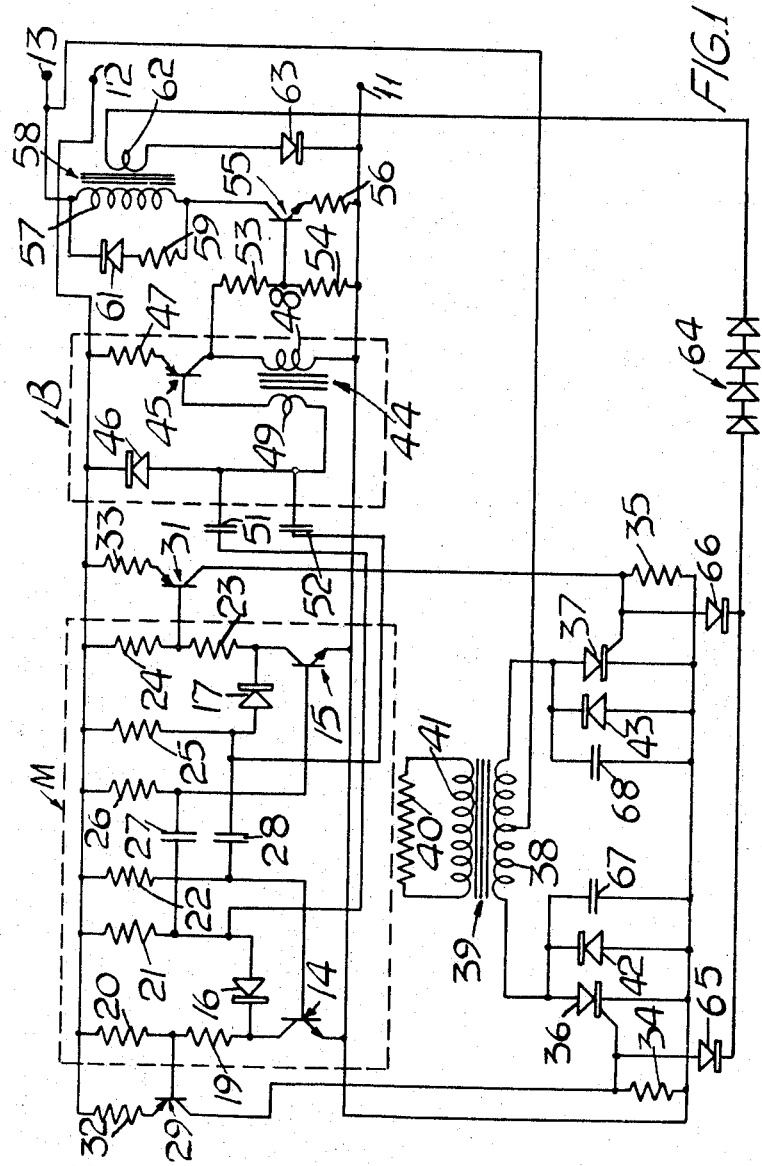
Figure 2:
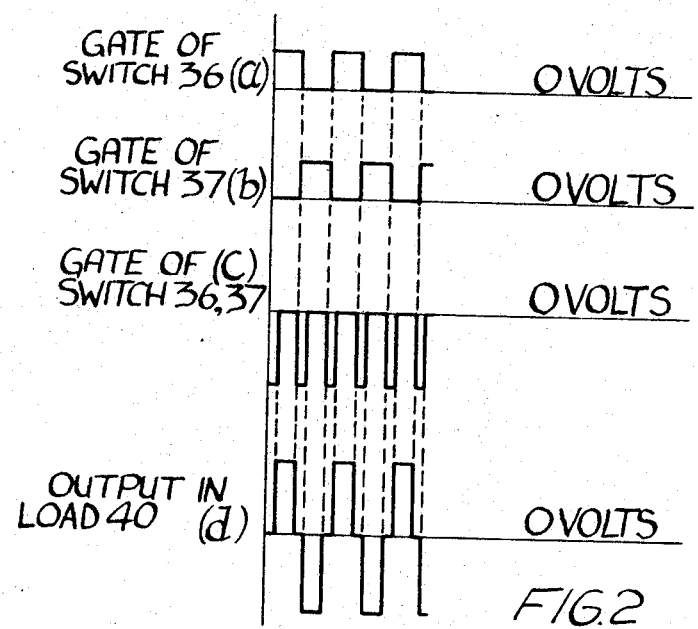
Figure 3:
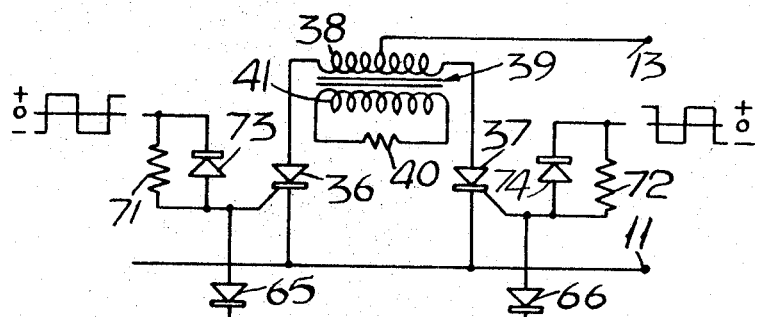

In the accompanying drawings, FIGURE 1 is a circuit diagram illustrating one example of the invention, FIGURE 2 illustrates the waveforms at various parts of the circuit shown in FIGURE 1, FIGURE 3 is a diagram of part of a circuit illustrating the principle of an alternative arrangement, FIGURE 4 is a circuit diagram illustrating a practical embodiment of the principle explained with reference to FIGURE 3, and FIGURE 5 illustrates the waveforms at various parts of the circuit shown in FIGURE 4.

Referring to FIGURE 1, there are provided first, second and third supply terminals 11, 12, 13, the supply terminals 11, 12 being connected to a D.C. source so that the terminal 11 is at earth potential or a negative potential, and the terminal 12 is at a relatively low positive potential with respect to the terminal 11, for example 10 volts. The terminal 13 is connected to the D.C. source so that the potential between the terminals 13, 11 is relatively large, for example 100 volts.

Connected between the terminals 11, 12 is a multivibrator M consisting of a pair of n.p.n. transistors 14, 15, a pair of diodes 16, 17, eight resistors 19 to 26 and a pair of capacitors 27, 28. The transistor 14 has its emitter connected to the terminal 11 and its collector connected to the terminal 12 through the resistors 19, 20 in series. The collector of the transistor 14 is also connected to the terminal 12 through the diode 16 in series with the resistor 21, whilst its base is connected to the terminal 12 through the resistor 22. The transistor 15 has its emitter connected to the terminal 11 and its collector connected to the terminal 12 through the resistors 23, 24 in series. The collector of the transistor 15 is also connected to the terminal 12 through the diode 17 and the resistor 25 in series, whilst its base is connected to the terminal 12 through the resistor 26. The base of the transistor 15 is connected through the capacitors 27 to a point intermediate the diode 16 and resistor 21, whilst the base of the transistor 14 is connected through the capacitor 28 to a point intermediate the resistor 25 and diode 17. The outputs from the multivibrator are taken from between the resistors 19, 20 and from between the resistors 23, 24 respectively, and are applied to the bases of p-n-p transistors 29, 31. The emitters of the transistors 29, 31 are connected to the terminal 12 through resistors 32, 33 respectively, whilst their collectors are connected to the terminal 11 through resistors 34, 35 respectively and in addition are connected to the gates of first and second gate controlled switches 36, 37. The switches 36, 37 have their cathodes connected to the terminal 11, and their anodes interconnected through a primary winding 38 of a transformer 39. The mid-point of the primary winding 38 is connected to the terminal 13 and the output from the inverter is applied to a load 40 connected across a secondary winding 41 of the transformer. A pair of diodes 42, 43 are connected across the switches 36, 37 respectively.

There is further connected between the terminals 11, 12 a blocking oscillator B consisting of a transformer 44, a p-n-p transistor 45, a diode 46 and a resistor 47. The primary winding 48 of the transformer 44 has one end connected to the terminal 11 and its other end connected to the collector of the transistor 45. The emitter of the transistor 45 is connected to the terminal 12 through the resistor 47, whilst its base is connected to the terminal 12 through a series circuit including the feedback winding 49 of the transformer 44 and the diode 46. The blocking oscillator is triggered by the output from the multivibrator, and for this purpose a point intermediate the diode 46 and the winding 49 is connected through a capacitor 51 to a point intermediate the diode 16 and resistor 21, and through a capacitor 52 to a point intermediate the diode 17 and resistor 25.

The collector of the transistor 45 is connected to the terminal 11 through resistors 53, 54 in series, a point intermediate these resistors being connected to the base of an n-p-n transistor 55 having its emitter connected to the terminal 11 through a resistor 56. The collector of the transistor 55 is connected to the terminal 13 through the primary winding 57 of a third transformer 58, the primary winding 57 being bridged by a resistor 59 in series with a diode 61. The secondary winding 62 of the transformer has one end connected to the terminal 11 through a diode 63 and its other end connected through the cathodes and anodes of a plurality of diodes 64 in series to the cathodes of diodes 65, 66 respectively having their anodes connected to the gates of the switches 42, 43.

The operation of the inverter is best explained with reference to the waveforms shown in FIGURE 2. The multivibrator acts in known manner to produce square wave outputs which are amplified by the transistors 29, 31 and applied to the gates of switches 36, 37. The waveforms applied to these gates are shown in FIGURES 2(a) and 2(b) respectively, and it will be seen that these waveforms tend to turn the switches 36, 37 on. Each time the multivibrator changes state, the blocking oscillator is triggered by way of one of the capacitors 51, 52 and so produces outputs which are amplified by the transistor 55 and transformer 58 to produce in winding 62 a succession of negative pulses which are shown in FIGURE 2(c) and are applied to the gates of both switches 36, 37. Assuming that switch 37 is on and switch 36 off, then a pulse shown in FIGURE 2(a) is applied to the gate of switch 36, but cannot turn it on because the pulse shown in FIGURE 2(c) is present at the same time and holds the switch 36 off whilst at the same time turning the switch 37 off. The pulse from the oscillator is narrower than the pulse from the multivibrator, and switch 36 is switched on as soon as the pulse shown in FIGURE 2(c) is removed. The width of the pulse shown in FIGURE 2(c) is chosen to be sufficient to allow the switch 37 to turn off completely, so that there is no possibility of switches 36, 37 being on simultaneously even for the short period of time taken for a switch to turn off.

The operation when switches 36, 37 are on and off respectively is similar. When switch 36 is on current flows from terminal 13 through the left hand side of winding 38 and switch 36 to terminal 11. When the switch 37 is on current flows from terminal 13 through the right hand side of winding 38 and switch 37 to terminal 11. The resultant waveform in the load 40 is shown in FIGURE 2(d).

The diodes 42, 43 serve to prevent the back E.M.F. from making the negative end of the primary winding 38 of the transformer 39 more negative than the terminal 11, whilst the plurality of diodes 64 connected in series ensure that the pulses for turning on the switches 36, 37 are not short circuited through the winding 62 of the transformer 58, and the diodes 65, 66 are required to prevent the switch-on pulses from being applied to both switches 36, 37 simultaneously.

If desired, a pair of capacitors 67, 68 can be connected across the diodes 42, 43 respectively. The capacitors 67, 68 reduce the amplitude of the pulses required to turn off the switches 36, 37.

In the arrangement described above, the pulses shown in FIGURE 2(c) must be of sufficiently high power to turn one of the switches 36, 37 off and to hold the other switch off. In many applications, however, it is more convenient to use pulses of lower power, and in such cases it is preferable to use the arrangement shown in FIGURE 3, in which parts equivalent to those in FIGURE 1 are designated with the same reference numerals. In this example, the pulses applied through the diodes 65, 66 are sufficient to prevent the switches 36, 37 from being turned on, but cannot themselves turn the switches 36, 37 off. The pulses for turning the switches 36, 37 on and off are supplied by a common generator as indicated by the waveforms shown in FIGURE 3. Since the current required to turn on the switches 36, 37 is less than that required to turn them off, it is applied through resistors 71, 72 which are by-passed by diodes 73, 74 respectively when negative current is supplied to the gates.

A practical version of the circuit shown in FIGURE 3 is illustrated in FIGURE 4, and includes a main oscillator A, a first generator C which is operated by the oscillator A and produces the pulses for holding the switches 36, 37 off, and a main generator E which produces the pulses for turning the switches 36, 37 on and off, the generator E being controlled by a second generator D which in turn is controlled by the oscillator A.

The oscillator A comprises a resistor 76 and a Zener diode 77 connected in series between positive and negative terminals 115, 116 of a D.C. source, the diode 77 being bridged by a variable resistor 78, a resistor 79 and a four layer diode 81 in series. The diode 81 has a capacitor 82 and a resistor 83 connected in series across it. The diode 77 stabilises the D.C. supply, and the arrangement is such that the capacitor 82 charges until the diode 81 breaks down. The capacitor then discharges through the diode 81, the diode 81 becomes non-conductive, and the cycle is repeated.

The generator C is a conventional blocking oscillator coupled by a resistor 84 to a point intermediate the resistor 83 and capacitor 82. When the diode 81 breaks down, the lower plate of capacitor 82 becomes more negative than the terminal 116 and transistor 85 conducts, energy being fed back to its base in the usual way by a transformer 86. This transformer is provided with output windings 87, 88, the winding 87 having one end connected to the cathode of the switch 36 and its other end connected to the gate of the switch 36 through a Zener diode 89, a diode 91 and a further diode 92. The winding 88 has one end connected to the cathode of the switch 37 and its other end connected to the gate of the switch 37 through a Zener diode 93, a diode 94 and a further diode 95.

The diodes 91, 94 are equivalent to the diodes 65, 66 in the simplified FIGURE 3, and the Zener diodes 89, 93 prevents short-circuiting of current flowing through resistors 71, 72 by the windings 87, 88. The generator C produces the pulses shown in FIGURE 5(a) which prevents a switch 36, 37 from being turned on until the previously conducting switch is off, but the presence of diodes 92, 95 has an important bearing on the operation of the circuit. In FIGURE 3, the hold-off pulse and the pulse for turning on a switch are both applied to the gate, and the difference between them is of insufficient magnitude to turn the switch on. However, the pulse applied by generator C will arrive momentarily before the pulse from generator E, as shown in FIGURES 5(b) and 5(c) and as will be explained later, and will tend to turn off the appropriate switch, which might lead to damage as a result of the switch being left in a partially conducting condition. By virtue of the diodes 92, 95, this does not happen because the pulse for holding a switch off is not applied to the gate of the switch, the pulse for holding off a switch being blocked before it reaches the gate.

The generator D is a further blocking oscillator coupled to the junction of a capacitor 82 and resistor 83 by a resistor 96. The output from the oscillator is taken from a winding 97 which as shown is conveniently wound as a single winding with the feed back winding 98 of the generator D. The output from the generator D is shown in FIGURE 5(b), and it will be noted that the pulses are narrower than those produced by the generator C.

The generator E is a square wave oscillator including transistors 99, 101 the emitters of which are connected for the terminal 11 and the collectors of which are connected to opposite ends of the primary winding 102 of a transformer 103, the mid-point of the primary winding being connected to the terminal 13, and the primary winding being bridged by a capacitor 104. The transformer includes a feedback winding 105 one end of which is connected to the base of the transistor 99 and the other end of which is connected through a capacitor 106 to the base of the transistor 101, and a pair of output windings 107, 108. Winding 107 has one end connected to the cathode of switch 36 and its other end connected to the junction of resistor 71 and diode 73. Whilst one end of winding 108 is connected to the cathode of switch 37 and its other end is connected to the junction of resistor 72 and diode 74.

The input to the generator E is supplied by way of resistors 109, 110 through which the bases of the transistors 99, 101 are connected to one end of the winding 97, the other end of this winding being connected to terminal 116.

Assuming that transistor 99 is conducting, a pulse received from winding 97 turns off transistor 99 and holds transistor 101 off. When the pulse terminates, then by virtue of the capacitor 106 the transistor 101 will conduct and the transistor 99 will be off. The next pulse switches off transistor 101 at the beginning of the pulse and transistor 99 again conducts at the end of the pulse. The output from the generator E is thus a stepped square wave as shown in FIGURE 5(c), and the resultant load current is shown in FIGURE 5(d).

The capacitor 104 is provided to eliminate any inductive overshoot of the transformer 103. The reason for providing a stepped square wave is to ensure that the pulses shown in FIGURE 5(a) will always be generated before the pulses from the generator E.

In the drawings, the winding 38 could be replaced by two windings having a point intermediate their ends connected to terminal 13, but they would effectively act as a single primary winding.

Having thus described our invention, what we claim as new and desire to secure by Letters Patent is:

1. An electric current inverter comprising in combination a D.C. source, first and second terminals connected to said D.C. source, a transformer including a secondary winding in which the required A.C. output is generated and a primary winding having a point intermediate its end connected to said first terminal, a pair of gate controlled switches through which the ends of the primary winding respectively are connected to the second terminal, and a switching circuit associated with the gates of said switches for producing an alternating current flow in said secondary winding, said switching circuit including means for supplying positive pulses alternately to the gates of said switches, and means for supplying negative pulses to the gates of both switches each time a positive pulse is applied to a gate, the negative pulses being of shorter duration than the positive pulses and serving both to turn off the conducting switch and to prevent the non-conducting switch from being turned on by the positive pulse until the negative pulse is removed, so that said switches are turned on and off but with a delay between turning off the conducting switch and turning on the non-conducting switch so that only one switch conducts at a time.

2. An inverter as claimed in claim 1 in which said means for supplying positive pulses is a multivibrator.

3. An inverter as claimed in claim 2 in which the negative pulses are supplied by a blocking oscillator triggered by the multivibrator.

4. An electric current inverter comprising in combination a D.C. source, first and second terminals connected to said D.C. source, a transformer including a secondary winding in which the required A.C. output is generated and a primary winding having a point intermediate its ends connected to the first terminal, a pair of gate controlled switches through which the ends of the primary winding respectively are connected to the second terminal, and a switching circuit associated with the gates of said switches for producing an alternating current flow in said secondary winding, said switching circuit including means generating a pair of wave forms 180° out of phase and each consisting of alternate positive and negative pulses, said wave forms being applied to the gates of said switches respectively, said switching circuit further including means generating further negative pulses of shorter duration than said positive pulses, said further negative pulses preventing a switch from being turned on by the positive pulses in said wave forms until the further negative pulse is removed, so that a conducting switch will be turned off by a negative pulse in said wave forms before a non-conducting switch is turned on.

5. An inverter as claimed in claim 4 in which said further negative pulses are applied to the gates of said switches.

6. An inverter as claimed in claim 4 in which said further negative pulses are not applied to the gates of said switches, but are fed to the means producing said wave forms to prevent the positive pulses from turning on a non-conducting switch.

7. An inverter as claimed in claim 4 in which the pulses in said wave forms are delayed so that said further negative pulses are always produced before the pulses in the wave forms.

8. An inverter as claimed in claim 7 in which the switching circuit includes a main oscillator, first and second blocking oscillators triggered by said main oscillator, the first blocking oscillator producing said further negative pulses and the second blocking oscillator producing control pulses of shorter duration than said further negative pulses, said means for generating a pair of wave forms 180° out of phase comprising a generator controlled by the second blocking oscillator, said delay being equal to the duration of the control pulses.

9. An inverter as claimed in claim 4 in which the positive pulses in said wave forms are applied to the gates of said switches through resistors which are bridged by diodes through which the negative pulses in said wave forms are applied to the gates.

References Cited

UNITED STATES PATENTS

| | | | |
|---|---|---|---|
| 3,097,335 | 7/1963 | Schmidt | 321—47 X |
| 3,120,634 | 2/1964 | Genuit | 321—47 X |
| 3,219,906 | 11/1965 | Keller et al. | 321—16 |
| 3,243,686 | 3/1966 | Forster | 321—45 |
| 3,246,226 | 4/1966 | Geisler et al. | 321—45 X |
| 3,257,604 | 6/1966 | Colclaser et al. | 321—45 |

JOHN F. COUCH, *Primary Examiner.*

W. SHOOP, *Assistant Examiner.*